United States Patent
Ergen

(10) Patent No.: US 11,252,656 B2
(45) Date of Patent: Feb. 15, 2022

(54) METHOD AND SYSTEM FOR DETERMINING AN OPTIMAL WIRELESS CHANNEL FOR A WI-FI ACCESS POINT IN A CLOUD-BASED SOFTWARE DEFINED NETWORK USING AN APPLICATION PROGRAMMING INTERFACE

(71) Applicant: Ambeent Wireless, Istanbul (TR)

(72) Inventor: Mustafa Ergen, Istanbul (TR)

(73) Assignee: AMBEENT WIRELESS, Istanbul (TR)

( * ) Notice: Subject to any disclaimer, the term of this patent is extended or adjusted under 35 U.S.C. 154(b) by 0 days.

(21) Appl. No.: 16/821,515

(22) Filed: Mar. 17, 2020

(65) Prior Publication Data
US 2021/0297945 A1    Sep. 23, 2021

(51) Int. Cl.
| | |
|---|---|
| *H04W 48/20* | (2009.01) |
| *H04W 72/04* | (2009.01) |
| *H04W 72/08* | (2009.01) |
| *H04W 48/16* | (2009.01) |
| *H04W 84/12* | (2009.01) |

(52) U.S. Cl.
CPC ......... *H04W 48/20* (2013.01); *H04W 48/16* (2013.01); *H04W 72/048* (2013.01); *H04W 72/08* (2013.01); *H04W 84/12* (2013.01)

(58) Field of Classification Search
CPC ............ H04W 52/0264; H04W 48/10; H04W 68/005; H04W 24/02
USPC .................................................... 455/88, 420
See application file for complete search history.

(56) References Cited

U.S. PATENT DOCUMENTS

| | | | |
|---|---|---|---|
| 8,805,110 B2 * | 8/2014 | Rhoads | H04N 1/00307 382/255 |
| 9,886,845 B2 * | 2/2018 | Rhoads | H04N 1/00307 |
| 10,922,957 B2 * | 2/2021 | Rhoads | H04L 67/34 |

(Continued)

FOREIGN PATENT DOCUMENTS

JP    6820954 B2 *    1/2021    ............ H04L 67/02

OTHER PUBLICATIONS

A Survey on Software-Defined Network and OpenFlow: From Concept to Implementation by Fei Hu; Qi Hao; Ke Bao Published in: IEEE Communications Surveys & Tutorials (vol. 16, Issue: 4, Fourthquarter 2014) May 2014 (Year: 2014).*

(Continued)

*Primary Examiner* — William D Cumming
(74) *Attorney, Agent, or Firm* — Chip Law Group

(57) ABSTRACT

A method and system for determining an optimal wireless channel for a Wi-Fi access point in a cloud-based software defined network (SDN) using an Application Programming Interface (API) is described. Initially, the API collects the measurement information and media access control (MAC) addresses from a plurality of nearby Wi-Fi access points to a client device. The measurement information is analyzed to determine a location of the client device using an Artificial Intelligence (AI) model. To determine the location of the client device, the API creates a plurality of clusters of Wi-Fi access points and updates the plurality of clusters with one or more newly identified Wi-Fi access points. Thereafter, the API calculates an optimal wireless channel for a Wi-Fi access point from the cluster using the AI model and enables the client device to automatically switch to the optimal wireless channel for connecting with the Wi-Fi access point.

20 Claims, 6 Drawing Sheets

(56) References Cited

U.S. PATENT DOCUMENTS

| | | |
|---|---|---|
| 11,026,241 B2* | 6/2021 | Ergen ............... H04W 24/02 |
| 2004/0165557 A1 | 8/2004 | Backes et al. |
| 2006/0217131 A1 | 9/2006 | Alizadeh-Shabdiz et al. |
| 2011/0212717 A1* | 9/2011 | Rhoads ............. G06F 16/9554 |
| | | 455/420 |
| 2014/0080428 A1* | 3/2014 | Rhoads ............. G06F 16/5838 |
| | | 455/88 |
| 2017/0026894 A1 | 1/2017 | Hu et al. |
| 2017/0236407 A1* | 8/2017 | Rhoads ............. G06K 9/6253 |
| | | 455/420 |
| 2017/0272317 A1 | 9/2017 | Singla et al. |
| 2018/0233028 A1* | 8/2018 | Rhoads .............. G08C 17/02 |
| 2019/0364492 A1* | 11/2019 | Azizi ................ H04W 48/16 |
| 2020/0084777 A1* | 3/2020 | Ergen ................ G06N 20/00 |
| 2020/0205062 A1* | 6/2020 | Azizi ............... H04W 68/005 |

OTHER PUBLICATIONS

B. Dezfouli, V. Esmaeelzadeh, J. Sheth and M. Radi, "A Review of Software-Defined WLANs: Architectures and Central Control Mechanisms," in IEEE Communications Surveys & Tutorials, vol. 21, No. 1, pp. 431-463, Firstquarter 2019, doi: 10.1109/COMST.2018. 2868692. (Year: 2019).*

Astuto et al., "A survey of software-defined networking: Past, present, and future of programmable networks." IEEE Communications surveys & tutorials 16.3 (2014): 1617-1634. Jan. 19, 2014 (Jan. 19, 2014) Retrieved on May 17, 2021 (May 17, 2021) from entire document.

International Search Report and Written Opinion of PCT Application No. PCT/US2021/022831, dated Jun. 22, 2021, 9 pages.

* cited by examiner

METHOD AND SYSTEM FOR DETERMINING AN OPTIMAL WIRELESS CHANNEL FOR A WI-FI ACCESS POINT IN A CLOUD-BASED SOFTWARE DEFINED NETWORK USING AN APPLICATION PROGRAMMING INTERFACE

FIELD OF THE INVENTION

The invention generally relates to determining an optimal wireless channel for a Wi-Fi access point in a cloud-based software defined network (SDN) using an Application Programming Interface (API). More specifically, the invention relates to calculating, by the API, an optimal wireless channel for the Wi-Fi access point using an Artificial Intelligence (AI) model and enabling the client device to automatically switch to the optimal wireless channel.

BACKGROUND OF THE INVENTION

Generally, Wi-Fi networks are formed using one or more Wi-Fi access points (APs) that support a connection of multiple wireless devices to a wired connection for access to the Internet. The Wi-Fi networks are growing larger by densely deploying the APs in places such as, but not limited to, residential spaces, apartments, office buildings and public spaces.

Current APs operate in an inefficient manner due to a decentralized decision-making structure and lack of adaptability in changing a network topology due to mobility of stations (STAs), increased number of Wi-Fi devices such as, but not limited to, mobile phones, Wi-Fi based Internet of Things (IoT) devices, smart televisions (TVs) and the like, and AP density. Also, current Wi-Fi network architectures accessed by users suffer from reduced throughput due to the decentralized structure.

Further, recent Wi-Fi protocol addresses the higher data delivery rate per time primarily by increased modulation that is applicable to only high signal to noise ratios (SNRs). On the other hand, due to increased number of Wi-Fi devices and IoT, the APs are always exposed to external neighbor signals.

Also, the current APs include a channel scanning property, which scans the channels and performs a simplified channel assignment by considering received signal strength indicator (RSSI) that APs receive from nearby APs ($RSSI_{AP-AP}$) and the number of APs. If a new channel assignment is needed, the APs halt the transmission by taking the antenna into monitoring mode. The continuous repetition of halting the APs results in significant internet quality issues for STAs.

Further, a typical criterion in wireless communication is the signal quality which is the ratio of the primary signal power and the interfering signal powers on a same transmission channel. The signal quality of wireless communication is determined as SINR, which is applicable to both STAs and APs. Since an STA becomes the transmitter when uploading data, the overall network quality is favored by increasing the SINRs for all individual network elements and for all transmission paths. Therefore, an RSSI matrix which includes $RSSI_{AP-AP}$, $RSSI_{AP-STA}$, $RSSI_{STA-AP}$, and $RSSI_{STA-STA}$ is considered for the most accurate decision making in selecting a transmission channel. Here, the $RSSI_{AP-AP}$ is the RSSI that APs receive from nearby APs, $RSSI_{AP-STA}$ is the RSSI that APs receive from nearby STAs, $RSSI_{STA-AP}$ is the RSSI that STAs receive from nearby APs, and $RSSI_{STA-STA}$ is the RSSI that STAs receive from nearby STAs. However, only a subset of RSSI matrix is measured in real time in a cost-effective manner and this in turn results in different approaches to Wi-Fi management.

An advantage of an existing approach to Wi-Fi management is that the APs perform better considering Clear Channel Assessment (CCA) which evaluates the maximum interference level to start the transmission. However, the existing approach does not guarantee that the data is transmitted to the STA since SINR is not included explicitly.

Further, there are various drawbacks for the large-scale implementation. Firstly, old APs do not have a scanning mode and transmit data on a predefined factory-set channel unless the users take a manual action to change the channel. Secondly, there is no centralized solution. Thirdly, the solution is totally vendor dependent, wherein the vendor modifies and updates all APs and constructs a cloud for the centralized computations. Combining the solution with other vendors is a challenging task and the integration is not cost-effective. Finally, even if the optimal channels are calculated in the cloud, there is no practical way to implement those on the APs.

While comparing $RSSI_{AP-STA}$ with $RSSI_{AP-AP}$, it is difficult to measure $RSSI_{AP-STA}$ and to upload parameters to the cloud in real-time. Since the STAs are highly mobile and the APs are to be scanned constantly, the APs cause interruption in transmission. However, there is no practical way to measure $RSSI_{STA-STA}$. In theory, any STA which uploads a data packet causes interference to nearby APs and STAs. However, most STAs are downloaders and the interference impact is ignored mostly.

Additionally, existing methods for channel assignment or modification of a channel for better Wi-Fi signal quality is implemented using a programming language snippet, manual configuration, remote management options, connecting cloud, or a modem interface web page. However, the channel change requirement needs a gateway connection which is established through a RAM-efficient browser alternative in a mobile operating system.

The channel change is implemented only when an STA is connected to the network either via a wired or wireless network, and is very useful when the STA is connected to the AP. The browser in an STA efficiently simulates the behavior of the users while connecting to the gateway and alters the channel while clicking on the buttons provided by the vendor. Further, the browser in the STA is automated by installing a specific software on the STA and provides an application to become the host of the AP to access the gateway and the AP credentials for logging into the AP. However, a typical AP can suffer from the abnormalities while changing the channel. For instance, the AP gateway interface can sometimes freeze, due to RAM inefficiencies in the AP or due to other unknown reasons.

Therefore, in light of the above, there is a need for a method and system for improving signal quality and efficiency of a Wi-Fi network by automatically assigning an optimal wireless channel to a Wi-Fi access point using an Artificial Intelligence (AI) model.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
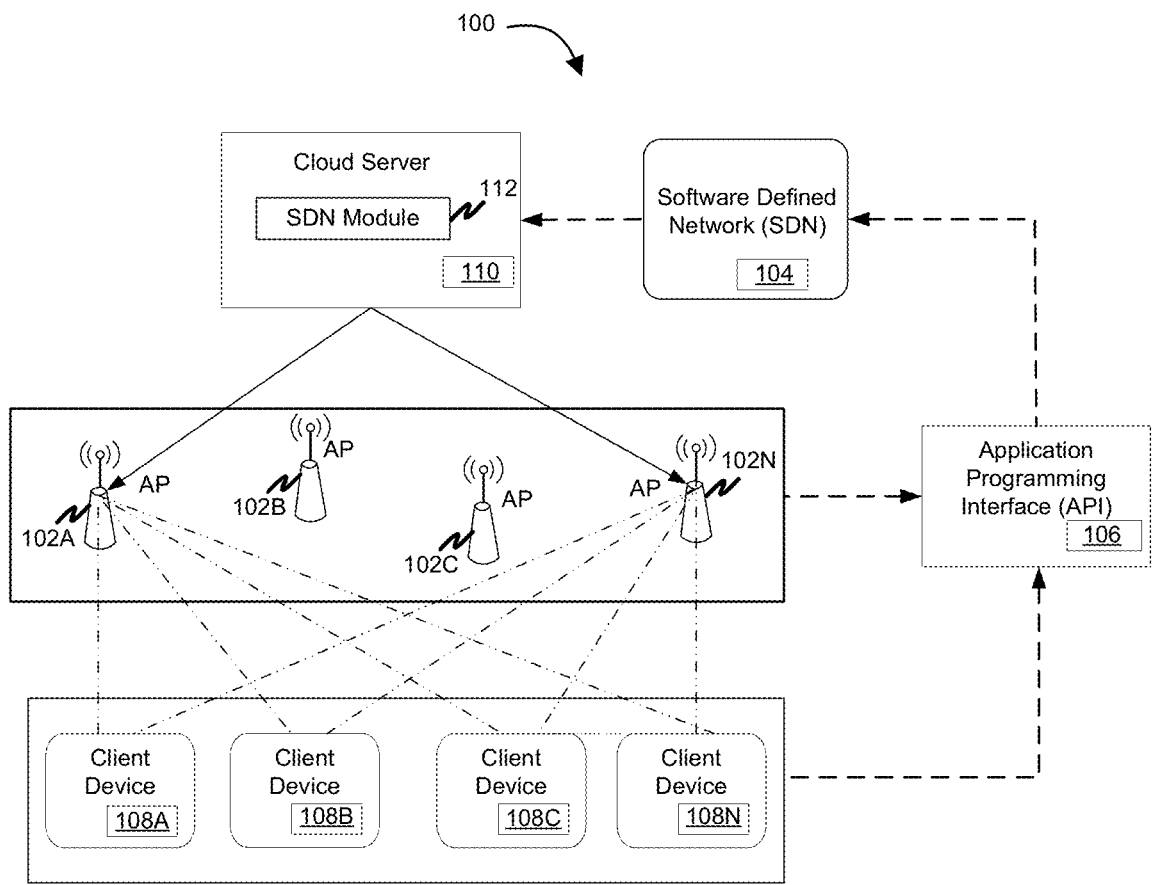
FIG. 1 illustrates a system for determining an optimal wireless channel for a Wi-Fi access point from a plurality of Wi-Fi access points in a software defined network (SDN) using an Application Programming Interface (API) in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to calculating, by an Application Programming Interface (API), an optimal wireless channel for a Wi-Fi access point using an Artificial Intelligence (AI) model and enabling the client device to automatically switch to the optimal wireless channel.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for determining an optimal wireless channel for a Wi-Fi access point in a cloud-based software defined network (SDN) using an API. To start with, the measurement information and media access control (MAC) addresses are collected from a plurality of nearby Wi-Fi access points to a client device, using the API. The measurement information includes, but is not limited to, RSSIs, radio frequency (RF) measurements, PING statistics, Universal Plug and Play (UPnP) information, and device information of the plurality of nearby Wi-Fi access points. Once the measurement information is collected, the measurement information is analyzed to determine a location of the client device using an AI model. To determine the location of the client device, the API creates a plurality of clusters of Wi-Fi access points and updates the plurality of clusters with one or more newly identified Wi-Fi access points. The API also uses a distribution algorithm to allocate the one or more newly identified Wi-Fi access points to a cluster of the plurality of clusters based on the distance of the one or more newly identified Wi-Fi access points from the cluster and the measurement information collected from the plurality of nearby Wi-Fi access points. Upon determining the location of the client device, the API calculates an optimal wireless channel for a Wi-Fi access point from the cluster using the AI model and enables the client device to automatically switch to the optimal wireless channel and a frequency band, for connecting with the Wi-Fi access point.

FIG. 1 illustrates a system 100 for determining an optimal wireless channel for a Wi-Fi access point 102A from a plurality of nearby Wi-Fi access points 102A-102N in an SDN 104 using an API 106 in accordance with an embodiment of the invention.

As illustrated in FIG. 1, system 100 includes API 106 which is communicatively coupled to plurality of nearby Wi-Fi access points 102A-102N, a plurality of client devices 108A-108N and a cloud server 110.

API 106 can be integrated into any application (app), mobile operating system or an embedded device.

Plurality of nearby Wi-Fi access points 102A-102N are deployed in places such as, but not limited to, homes, enterprises, and public spaces. Plurality of client devices 108A-108N are user devices such as, but not limited to, a mobile device, a personal digital assistant, a computer, a laptop, a smart phone, and a tablet.

Cloud server 110 includes an SDN module 112 that communicates with SDN 104 and acts as a centralized structure for determining an optimal wireless channel for plurality of nearby Wi-Fi access points 102A-102N.

SDN module 112 includes an infrastructure management function which comprises Spectrum Broker (SB) function which is configured to obtain, optimize and automate spectrum resources. The SB function can be extended to Low Power Wide Area Networks (LPWANs) that use sub-GHz radio frequencies (typically 433 or 868 MHz) with typical transmission ranges in the order of 1 up to 50 kilometers. Notorious initiatives in this domain include, but are not limited to, Long Range (LoRa), Sigfox™ and the upcoming IEEE 802.11ah (or "HaLow") standard or NarrowBand-Internet of Things (NB-IoT) and 5G massive machine-type communications (mMTC). The SB function considers signal strengths and application specific parameters to manage the spectrum.

To determine an optimal wireless channel for a Wi-Fi access point 102A of plurality of nearby Wi-Fi access points 102A-102N, API 106 collects MAC addresses and measurement information from plurality of nearby Wi-Fi access points 102A-102N to a client device 108A of plurality of client devices 108A-108N.

The measurement information collected from plurality of nearby Wi-Fi access points 102A-102N may include, but need not be limited to, received signal strength indicators (RSSIs), radio frequency (RF) measurements, PING statistics, universal plug and play (UPnP) information, and device information of plurality of nearby Wi-Fi access points 102A-102N.

Once the measurement information corresponding to plurality of nearby Wi-Fi access points 102A-102N is collected, the measurement information is fed into SDN module 112 according to time and location of client device 108A for processing at variable and adaptable frequencies, and the measurement information is recorded in a database.

SDN module 112 processes the measurement data and derives the optimal wireless channel settings of one or more decision variables for Wi-Fi access point 102A using the measurement information. The one or more decision variables can be, but need not be limited to, an 802.11 mode, an 802.11 protection, an operating channel bandwidth, channels in use, a WAN managed upstream bandwidth and LAN managed downstream bandwidth. The optimal wireless channel settings of the one or more decision variables are derived by integrating complex and advanced algorithms that use the measurement information while deciding the optimal wireless channel.

Moving on, the measurement information stored in the database is verified to determine whether the measurement information received from MAC address corresponding to Wi-Fi access point 102A is stored in the database. Upon determining that Wi-Fi access point 102A is not stored in the database, Wi-Fi access point 102A is stored in the database using API 106.

Further, API 106 communicatively coupled with SDN module 112 continuously monitors for any changes in the measurement information of plurality of nearby Wi-Fi access points 102A-102N in the database, and accordingly updates the database.

Furthermore, SDN module 112 is an integration of complex and advanced algorithms which employ leading and easy-measurable properties while selecting the optimal wireless channel for Wi-Fi access point 102A. The complex and advanced algorithms included in SDN module 112 utilize historical measurements collected from plurality of Wi-Fi access points 102A-102N and calculate the optimal wireless channel for Wi-Fi access point 102A. The process of calculating the optimal wireless channel for Wi-Fi access point 102A is further described in detail in conjunction with FIG. 2.

Figure 2:
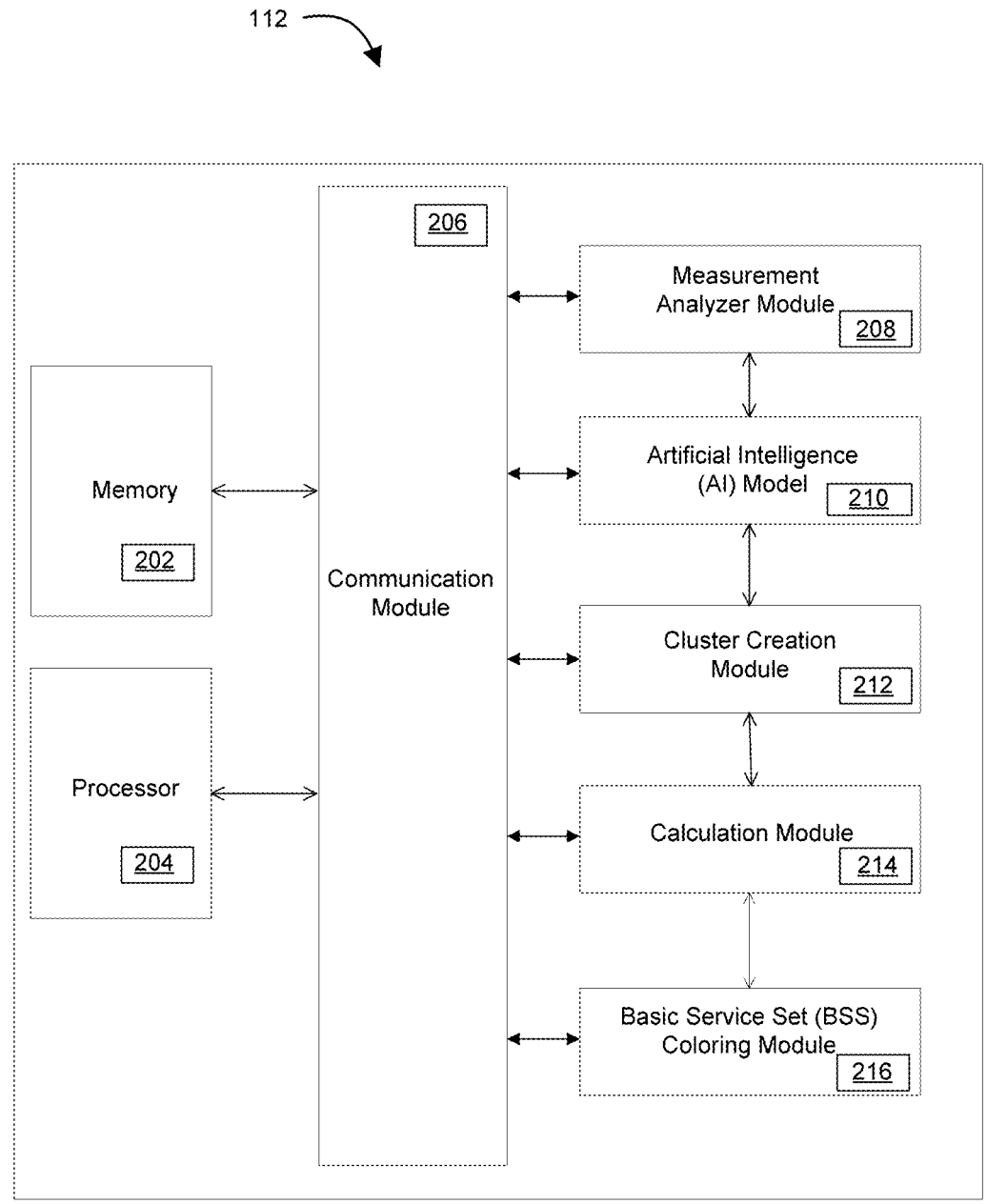
FIG. 2 illustrates an SDN module of a cloud server for calculating an optimal wireless channel for a Wi-Fi access point using the API in accordance with an embodiment of the invention.

FIG. 2 illustrates SDN module 112 of cloud server 110 for calculating the optimal wireless channel for Wi-Fi access point 102A using API 106 in accordance with an embodiment of the invention.

As illustrated in FIG. 2, SDN module 112 includes a memory 202, and a processor 204 communicatively coupled to memory 202. Memory 202 and processor 204 further communicate with various modules of SDN module 112 via a communication module 206.

Communication module 206 may be configured to transmit data between modules, engines, databases, memories, and other components of SDN module 112 for use in performing the functions discussed herein. Communication module 206 may include one or more communication types and utilize various communication methods for communication within SDN module 112.

The MAC addresses and measurement information corresponding to plurality of nearby Wi-Fi access points 102A-102N collected by API 106, are fed into a measurement analyzer module 208 of SDN module 112. Measurement analyzer module 208 installed on plurality of client devices 108A-108N is capable of reporting information related to plurality of nearby Wi-Fi access points 102A-102N, channels associated with plurality of nearby Wi-Fi access points 102A-102N and their RSSIs to cloud server 110.

At measurement analyzer module 208, the measurement information generated from plurality of client devices 108A-108N is filtered using a plurality of filters and statistical monitoring methods to avoid excessive data generated by plurality of client devices 108A-108N. Subsequently, the filtered measurement information is used to determine an upload frequency from client device 108A of plurality of client devices 108A-108N for establishing a connection with Wi-Fi access point 102A of plurality of nearby Wi-Fi access points 102A-102N.

Upon establishing the connection with Wi-Fi access point 102A, measurement analyzer module 208 performs speed tests to determine a backhaul when signal strength is high and channel is optimum. Measurement analyzer module 208 also determines an 802.11 protocol of Wi-Fi access point 102A for distributing Wi-Fi resources efficiently and transmitting the Wi-Fi resources received by client device 108A to cloud server 110 for evaluation.

Further, measurement analyzer module 208 runs in the background to report a change in current RF conditions of Wi-Fi access point 102A and triggers an AI model 210 of SDN module 112 for determining the optimal wireless channel.

To determine the optimal wireless channel, AI model 210 is used to determine a location of client device 108A based on the measurement information analyzed by measurement analyzer module 208. AI model 210 utilizes measurements under different RF conditions to maximize the overall Wi-Fi performance by solving a complex optimization problem with easily measured variables.

Moving on, the location of client device 108A is determined by creating a plurality of clusters of Wi-Fi access points by API 106 using a cluster creation module 212 included in SDN module 112.

The plurality of clusters of Wi-Fi access points are created using an algorithm in AI model 210 to statistically identify one or more clusters of the plurality of clusters and solve the optimization problem of each cluster to determine the optimal wireless channel for Wi-Fi access point 102A. The algorithm included in AI model 210 is also used to identify a cluster from another cluster using radio strength measurements if the cluster is distant.

Upon creating the plurality of clusters of Wi-Fi access points, cluster creation module 212 is enabled to update the plurality of clusters with one or more newly identified Wi-Fi access points. The one or more newly identified Wi-Fi access points are allocated to a cluster of the plurality of clusters using a distribution algorithm based on the distance of the one or more newly identified Wi-Fi access points from the cluster and the measurement information collected from plurality of nearby Wi-Fi access points 102A-102N.

The distribution algorithm is also used to evaluate position/distance of plurality of nearby Wi-Fi access points 102A-102N and allocates each Wi-Fi access point of plurality of nearby Wi-Fi access points 102A-102N to the cluster using a KMeans algorithm.

Further, AI model 210 is used to collect measurements from plurality of nearby Wi-Fi access points 102A-102N allocated to the clusters to determine the location of client device 108A.

Upon determining the location of client device 108A, API 106 enables a calculation module 214 included in SDN module 112 to calculate the optimal wireless channel for Wi-Fi access point 102A from the cluster using AI model 210.

Once the optimal wireless channel for Wi-Fi access point 102A is calculated, API 106 enables client device 108A to automatically switch to the optimal wireless channel and a frequency band to connect with Wi-Fi access point 102A. The frequency band can be, but need not be limited to, a 2.4 GHz band, a 5 GHz band, a 6 GHz band, and the like.

Further, calculation module 214 uses a Basic Service Set (BSS) coloring module 216 to assign color codes to wireless channels of plurality of nearby Wi-Fi access points 102A-102N in the cluster. BSS coloring module 216 addresses medium contention overhead due to overlapping BSS (OBSS) and spatial reuse of the wireless channels.

Additionally, plurality of nearby Wi-Fi access points 102A-102N obtains an optimal wireless channel from either plurality of client devices 108A-108N or plurality of nearby Wi-Fi access points 102A-102N and automatically switches to the optimal wireless channel.

In an embodiment, Wi-Fi access point 102A from plurality of nearby Wi-Fi access points 102A-102N obtains the optimal wireless channel from cloud server 110 by automatically switching the wireless channel through a software used in Wi-Fi access point 102A. Wi-Fi access point 102A accesses the internet, although Wi-Fi access point 102A is not connected with a client device 108A from plurality of client devices 108A-108N.

Once the optimal wireless (transmission) channel is updated by AI model 210, Wi-Fi access point 102A or a Wi-Fi access point gateway or a Wi-Fi access point management server directly downloads the recent channel value and changes the optimal wireless channel internally. The database address is hard coded on Wi-Fi access point firmware or on an 802.11 chip set and remotely updates the database address for the database credentials and other algorithms.

In another embodiment, Wi-Fi access point 102A automatically changes the channel through a software integrated in Wi-Fi access point 102A, which obtains the optimal wireless channel from a probe request packet of nearby client device 108A of plurality of client devices 108A-108N.

Initially, plurality of client devices 108A-108N perform active scanning to report plurality of nearby Wi-Fi access points 102A-102N. In this case, a field in a standard probe request packet is defined, which carries the optimal wireless channel for Wi-Fi access point 102A. Once plurality of client devices 108A-108N identify MAC addresses of Wi-Fi access point 102A, the optimal wireless channel of the corresponding Wi-Fi access point 102A is obtained from cloud server 110 by plurality of client devices 108A-108N.

Further, plurality of client devices 108A-108N transmit directed probe requests to Wi-Fi access point 102A with an additional packet in the request which includes the optimal wireless channel of Wi-Fi access point 102A. The probe request received by plurality of nearby Wi-Fi access points 102A-102N reads the optimal wireless channel included in the request and changes the wireless channel through the software integrated within Wi-Fi access point 102A. To transmit the probe request, the Wi-Fi connection is not necessary. Thus, plurality of client devices 108A-108N constantly distribute the optimal wireless channels of plurality of nearby Wi-Fi access points 102A-102N.

In yet another embodiment, the optimal wireless channel is selected by a client device 108A of plurality of client devices 108A-108N through an advanced and modified JavaScript™ injection. In this case, instead of installing a software internally based on an external information received either directly from cloud server 110 or from plurality of client devices 108A-108N, an automatized software is used in plurality of client devices 108A-108N.

Each Wi-Fi access point of plurality of Wi-Fi access points 102A-102N includes a unique user interface design through which settings corresponding to the Wi-Fi access points are modified, which includes modifying or switching the wireless channel. The channel change actions within the interface are defined manually through JavaScript™ codes for different models and versions. The JavaScript™ runs within the browser and is controlled by Java apps. Further, a local server is implemented to provide the data flow path from the JavaScript™ to Java apps. The local server also provides data transfer and keeps track of the Java apps.

Figure 3:
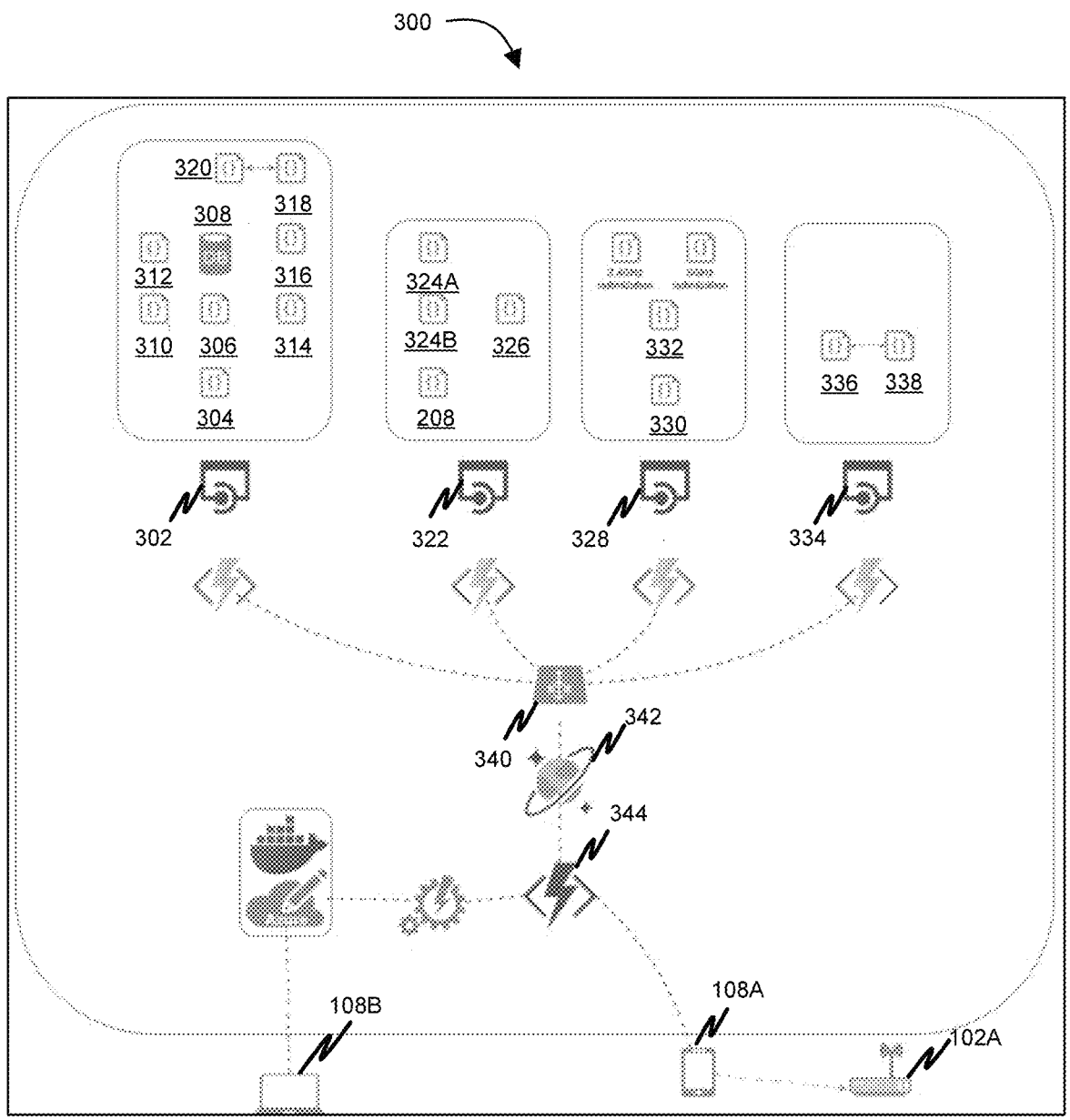
FIG. 3 illustrates a system which includes a plurality of APIs utilized in the SDN module of the cloud server for calculating an optimal wireless channel for a Wi-Fi access point in accordance with an exemplary embodiment of the invention.

FIG. 3 illustrates a system 300 which includes a plurality of APIs utilized by SDN module 112 of cloud server 110 for calculating the optimal wireless channel for Wi-Fi access point 102A in accordance with an exemplary embodiment of the invention.

As illustrated in FIG. 3, system 300 includes a measurement API 302 which collects MAC addresses and measurement information from plurality of nearby Wi-Fi access points 102A-102N to client device 108A. The measurement information and MAC addresses collected from plurality of nearby Wi-Fi access points 102A-102N are transmitted to a measurement handler 304.

Initially, the measurement information collected from plurality of nearby Wi-Fi access points 102A-102N is transmitted to a server from measurement handler 304 through a data updater 306 and is stored in a database 308.

The measurement information stored in database 308 is then verified to determine whether the measurement information received from MAC addresses corresponding to Wi-Fi access point 102A is stored in database 308. Upon determining that Wi-Fi access point 102A is not stored in database 308, Wi-Fi access point 102A is stored in database 308 using measurement API 302.

Further, the measurement information of plurality of nearby Wi-Fi access points 102A-102N stored in database 308 are checked to determine any changes in the measurement information based on location of plurality of nearby Wi-Fi access points 102A-102N using a location estimator 310 communicating with measurement handler 304.

Location estimator 310 identifies the location of plurality of nearby Wi-Fi access points 102A-102N based on the location of client device 108A and updates the MAC addresses and measurement information of plurality of nearby Wi-Fi access points 102A-102N in database 308. The measurement information received by location estimator 310 is transmitted to a relocator 312 for relocating one or more Wi-Fi access points in vicinity of client device 108A and stores the measurement information of the one or more Wi-Fi access points in vicinity in database 308.

Moving on, the measurement information related to plurality of Wi-Fi access points 102A-102N stored in database 308 are inserted into a distribution algorithm 314 to evaluate the position/distance of plurality of nearby Wi-Fi access points 102A-102N. Based on the position of plurality of nearby Wi-Fi access points 102A-102N, measurement API 302 uses a clustering algorithm 316 to create a plurality of clusters of Wi-Fi access points. Clustering algorithm 316 is also used to update the plurality of clusters with one or more newly identified Wi-Fi access points.

Further, the one or more newly identified Wi-Fi access points are allocated to a cluster of the plurality of clusters using distribution algorithm 314 based on the distance of the one or more newly identified Wi-Fi access points from the cluster and the measurement information collected from plurality of nearby Wi-Fi access points 102A-102N. If the one or more newly identified Wi-Fi access points are at a far distance from the cluster, measurement API 302 uses a distance clustering algorithm 318 to cluster the one or more newly identified Wi-Fi access points at that particular position or distance.

Upon identifying the position/distance of the one or more newly identified Wi-Fi access points, the one or more newly identified Wi-Fi access points are allocated to a corresponding cluster in a predefined distance using a KMeans algorithm 320. For instance, each cluster may include twenty Wi-Fi access points. Also, every new measurement update identified by measurement handler 304 triggers distribution algorithm 314 to bring plurality of nearby Wi-Fi access points 102A-102N closer to their true positions.

After collecting the measurement information using the plurality of algorithms, system 300 utilizes an Extras API 322 to analyze the measurement information for determining the optimal wireless channel for Wi-Fi access point 102A. Extras API 322 includes end points which does not require user interaction. Extras API 322 also includes reporting tools and modules to shorten long background processes.

Extras API 322 utilizes measurement analyzer module 208 to report information related to plurality of nearby Wi-Fi access points 102A-102N, channels associated with plurality of nearby Wi-Fi access points 102A-102N and their RSSIs. Further, the measurement information generated from plurality of client devices 108A-108N is filtered using a plurality of filters and statistical monitoring methods which may include, but need not be limited to, bulk update collector 324A and 324B to avoid excessive data generated by plurality of client devices 108A-108N. Based on the filtered measurement information, Extras API 322 determines an upload frequency from client device 108A and checks for an optimized channel using an optimized channel verification module 326 and establishes a connection with nearby Wi-Fi access point 102A.

Upon establishing the connection with Wi-Fi access point 102A, measurement analyzer module 208 performs speed tests to determine a backhaul when signal strength is high and channel is optimum. Further, measurement analyzer module 208 runs in the background to report a change in current RF conditions of Wi-Fi access point 102A and triggers an optimization API 328 to determine the optimal wireless channel for Wi-Fi access point 102A.

Optimization API 328 uses AI model 210 to collaborate plurality of clusters of Wi-Fi access points to determine the location of client device 108A. The location of client device 108A is determined using a historical data analyzer 330, which is used to analyze the plurality of clusters of Wi-Fi access points created using clustering algorithm 316 of measurement API 302.

Further, the plurality of clusters of Wi-Fi access points are used by a cluster divider 332 to statistically identify one or more clusters of the plurality of clusters and solve the optimization problem of each cluster of the plurality of clusters for determining one or more optimal wireless channels for Wi-Fi access point 102A.

Further, system 300 includes a routers API 334, wherein the measurement data of routers or plurality of Wi-Fi access points 102A-102N are collected according to the time and location of Wi-Fi access point 102A using a time-based fetcher 336 and a location based fetcher 338 of routers API 334.

The data collected from the plurality of APIs including, but not limited to, measurement API 302, extras API 322, optimization API 328 and routers API 334, is then transmitted to a load balancer 340, which is used to manage resources of the plurality of APIs based on a number of incoming requests received by each API.

The resources allocated to each API is stored in a globally distributed multi-model database 342 for triggering both non-relational databases and containers. Globally distributed multi-model database 342 uses a specific API 344 for assigning true channels and measurement data updates to client devices 108A and 108B with nearby Wi-Fi access point 102A.

Figure 4:
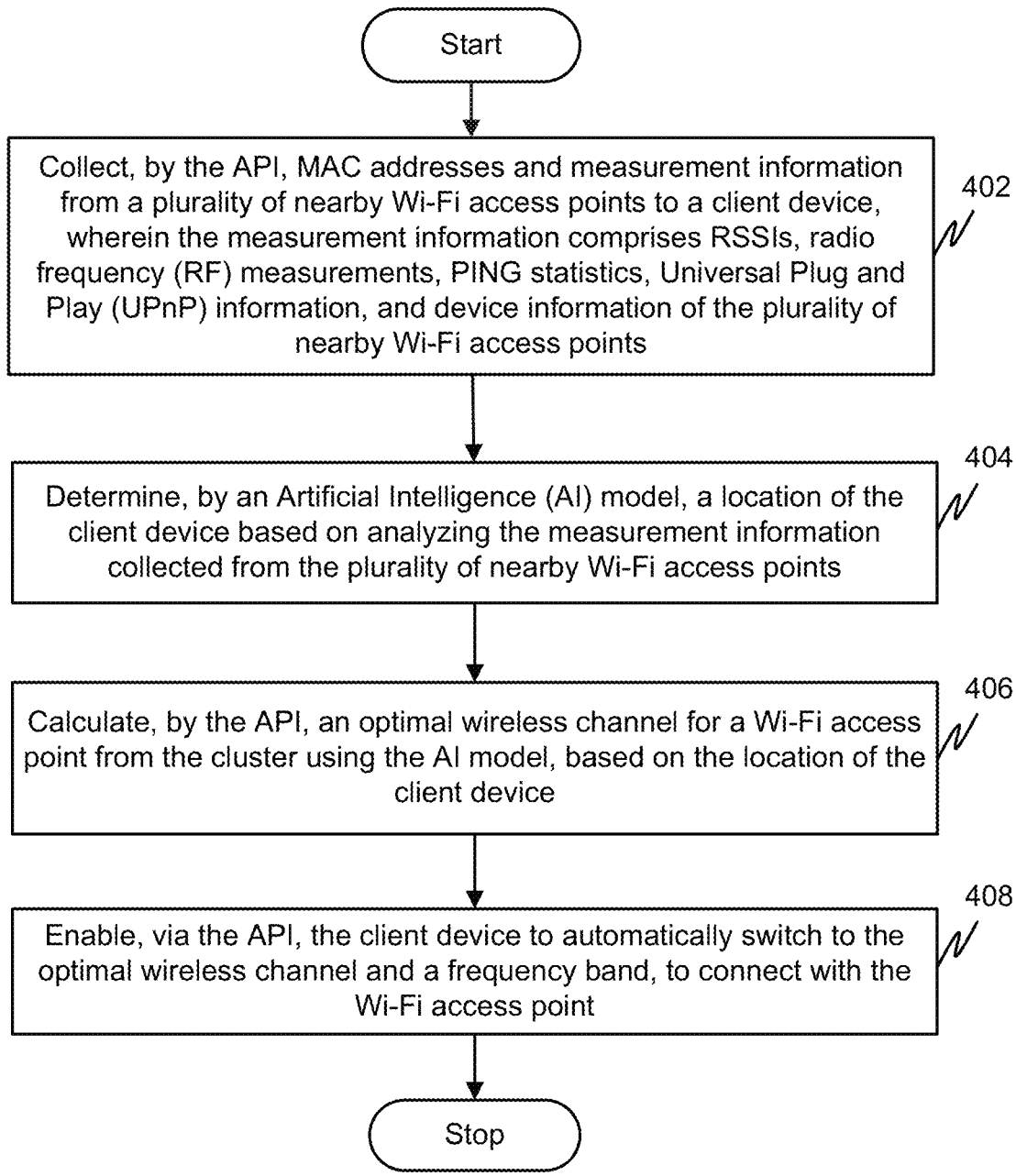
FIG. 4 illustrates a flowchart of a method for determining an optimal wireless channel for a Wi-Fi access point in the SDN using the API in accordance with an embodiment of the invention.

FIG. 4 illustrates a flowchart of a method for determining an optimal wireless channel for Wi-Fi access point 102A in SDN 104 using API 106 in accordance with an embodiment of the invention.

As illustrated in FIG. 4, at step 402, API 106 collects MAC addresses and measurement information from plurality of nearby Wi-Fi access points 102A-102N to client device 108A of plurality of client devices 108A-108N. The measurement information includes, but is not limited to, RSSIs, RF measurements, PING statistics, UPnP information, and device information of plurality of nearby Wi-Fi access points 102A-102N.

Once measurement information corresponding to plurality of nearby Wi-Fi access points 102A-102N is collected, the measurement information is fed into SDN module 112 included in cloud server 110 according to time and location of client device 108A for processing at variable and adaptable frequencies, and the measurement information is recorded in a database.

SDN module 112 includes an infrastructure management function which comprises Spectrum Broker (SB) function which is configured to obtain, optimize and automate spectrum resources. The SB function can be extended to Low Power Wide Area Networks (LPWANs) that use sub-GHz radio frequencies (typically 433 or 868 MHz) with typical transmission ranges in the order of 1 up to 50 kilometers. Notorious initiatives in this domain include, but are not limited to, Long Range (LoRa), Sigfox™ and the upcoming IEEE 802.11ah (or "HaLow") standard or NarrowBand-Internet of Things (NB-IoT) and 5G massive machine-type communications (mMTC). The SB function considers signal strengths and application specific parameters to manage the spectrum.

Moving on, the measurement information stored in the database is verified to determine whether the measurement information received from MAC address corresponding to Wi-Fi access point 102A is stored in the database. Upon determining that Wi-Fi access point 102A is not stored in the database, Wi-Fi access point 102A is stored in the database using API 106.

Further, API 106 communicatively coupled with SDN module 112 continuously monitors for any changes in the measurement information of plurality of nearby Wi-Fi access points 102A-102N in the database, and accordingly updates the database.

At step 404, the measurement information corresponding to plurality of nearby Wi-Fi access points 102A-102N is analyzed using measurement analyzer module 208 to determine a location of client device 108A by AI model 210. The location of client device 108A is determined by creating a plurality of clusters of Wi-Fi access points by API 106 using cluster creation module 212.

The plurality of clusters of Wi-Fi access points are created using an algorithm in AI model 210 to statistically identify one or more clusters of the plurality of clusters and solve the optimization problem of each cluster to determine the optimal wireless channel for Wi-Fi access point 102A. The algorithm included in AI model 210 is also used to identify a cluster from another cluster using radio strength measurements if the cluster is distant.

Upon creating the plurality of clusters of Wi-Fi access points, cluster creation module 212 updates the plurality of clusters with one or more newly identified Wi-Fi access points. The one or more newly identified Wi-Fi access points are allocated to a cluster of the plurality of clusters using a distribution algorithm based on the distance of the one or more newly identified Wi-Fi access points from the cluster and the measurement information collected from plurality of nearby Wi-Fi access points 102A-102N.

The distribution algorithm is also used to evaluate position/distance of plurality of nearby Wi-Fi access points 102A-102N and allocates each Wi-Fi access point 102A to the cluster using a KMeans algorithm.

In an ensuing step 406, API 106 uses calculation module 214 to calculate an optimal wireless channel for Wi-Fi access point 102A from the cluster using AI model 210 based on the location of client device 108A.

Upon calculating the optimal wireless channel for Wi-Fi access point 102A, at step 408, API 106 enables client device 108A to automatically switch to the optimal wireless channel and a frequency band which connects with Wi-Fi access point 102A.

Further, calculation module 214 uses BSS coloring module 216 to assign color codes to wireless channels of plurality of nearby Wi-Fi access points 102A-102N in the cluster. BSS coloring module 216 addresses medium contention overhead due to overlapping BSS (OBSS) and spatial reuse of the wireless channels.

In accordance with an embodiment, API 106 provides app-aware optimization by assigning an interference free channel to a user of an app according to a session type of the app. Therefore, neighbors of the user using low-bandwidth apps are assigned other channels for use.

Figure 5:
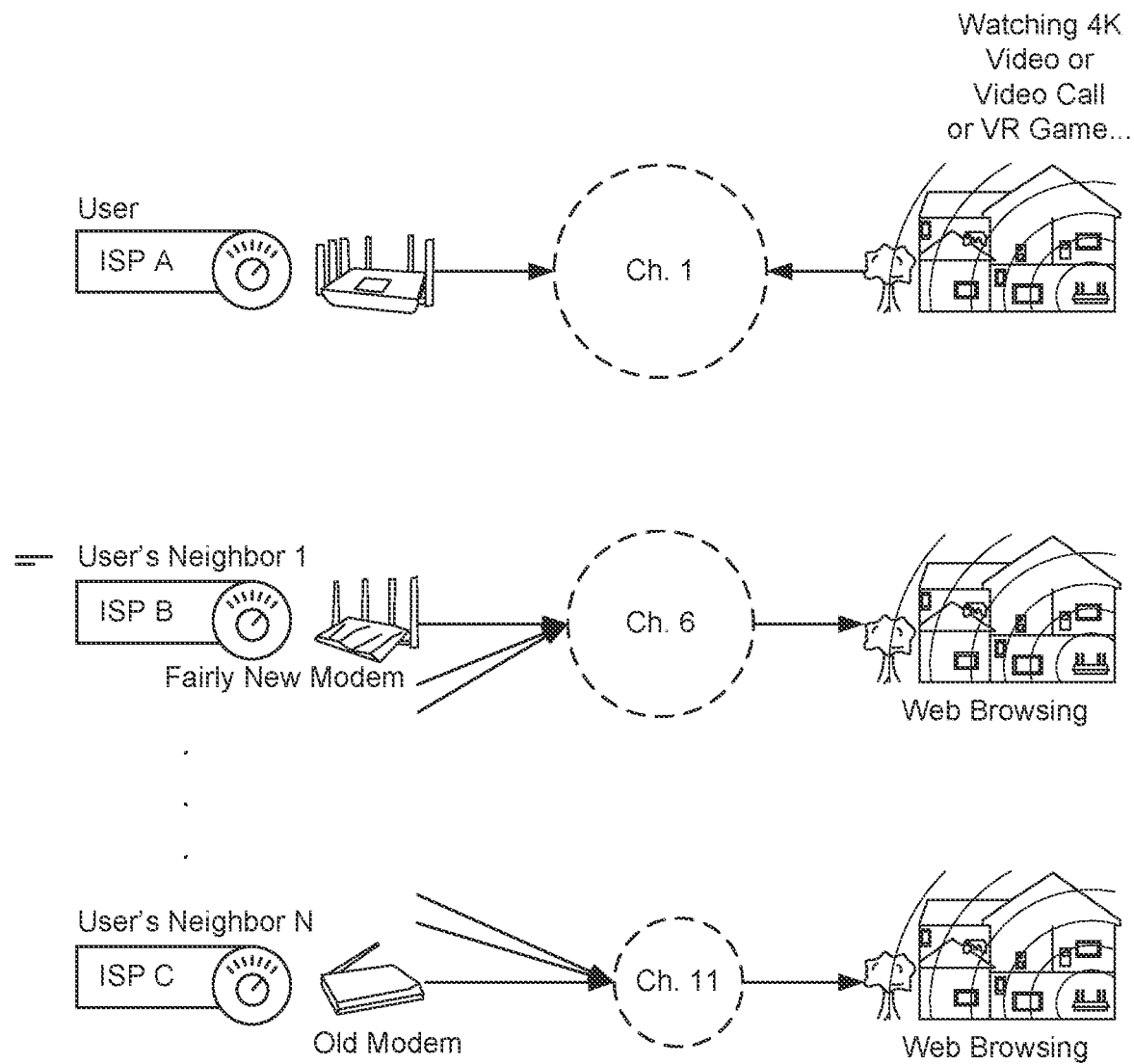
FIG. 5 illustrates application-aware optimization provided by the API in accordance with an embodiment.

FIG. 5 illustrates app-aware optimization provided by API 106 in accordance with an embodiment.

As illustrated in FIG. 5, when neighbors of the user exceed a number of overlapping channels, API 106 allocates channels according to one or more session types of apps.

Furthermore, API 106 provided by the invention may be integrated into apps of a home, hotel, internet service provider or cloud application service provider to enable the service providers monitor Wi-Fi access points of interest.

Figure 6:
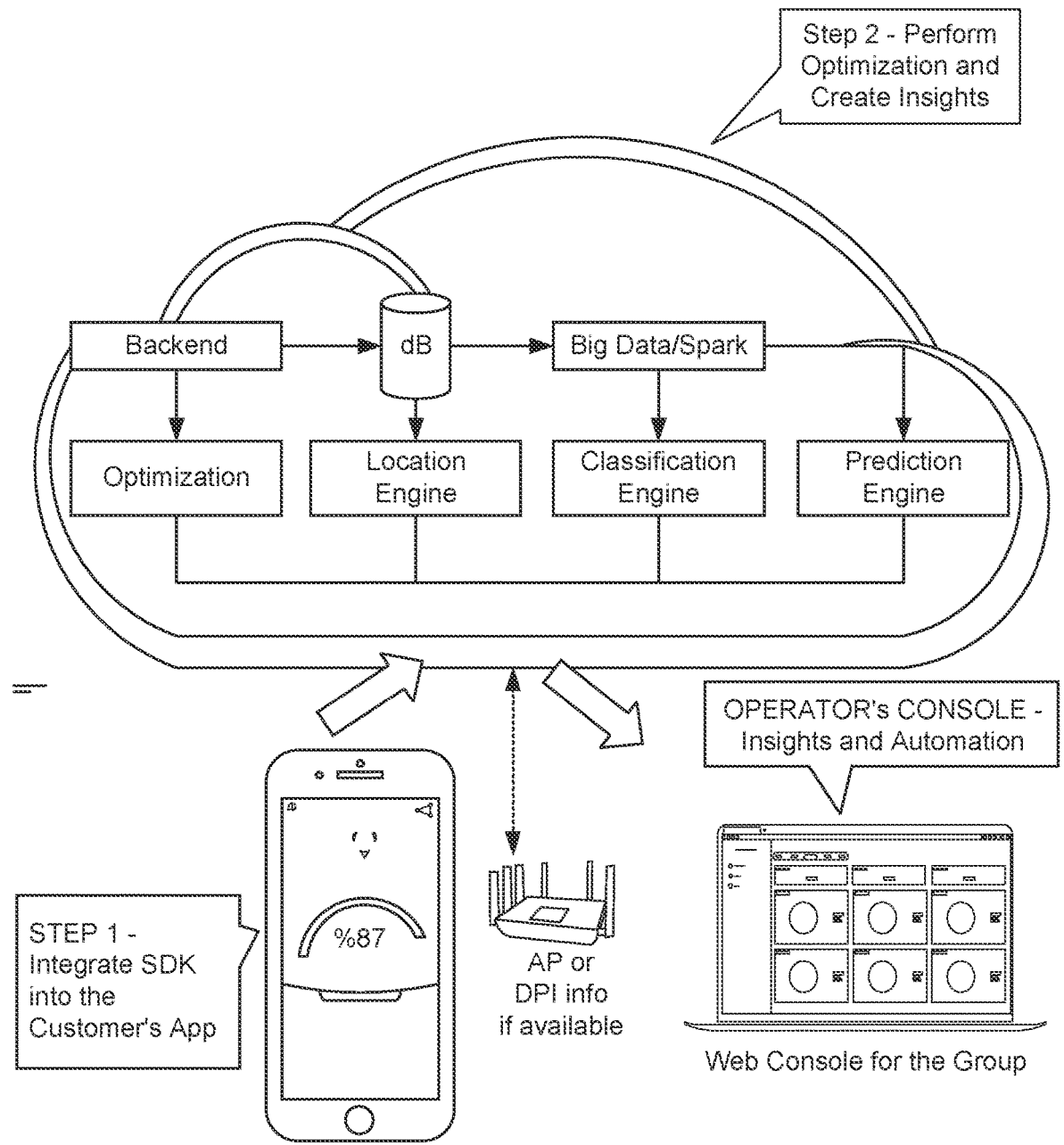
FIG. 6 illustrates an overview of the architecture for integrating the API into applications on a mobile device in accordance with an embodiment of the invention.

FIG. 6 illustrates an overview of the architecture for integrating API 106 into apps on a mobile device in accordance with an embodiment of the invention.

As illustrated in FIG. 6, to start with, API 106 (software development kit (SDK)) is integrated into a customer's app in a mobile device which provides a console in the cloud to enable the customers and/or service providers monitor Wi-Fi access points of interest. B2C customers can also enter a group ID to the app and can view the information through a web console from the apps as a sensor. In an ensuing step, the cloud performs optimization and creates insights based on the information received via the app. The insights are viewed by service providers and/or customer via a web console.

The invention utilizes an API which collects the MAC addresses, signal strength and frequency of all nearby Wi-Fi access points and calculates the optimal wireless channels of the Wi-Fi access points and enables the client device to automatically switch to the most efficient channel.

Further, the invention automatically assigns the most efficient channel for the Wi-Fi access points using AI algorithms, to guarantee that the plurality of client devices connected to the Wi-Fi access points always receive better signal quality.

Furthermore, the invention provides an effective mechanism that will mediate and optimize the contention that the 6 GHz bandwidth causes between 5G and Wi-Fi for channel access.

Additionally, the invention provides a flexible and higher wireless network quality by integrating a complex and advanced algorithm which considers an easily measurable property for deciding an optimal wireless channel for the Wi-Fi access point.

Furthermore, the integration of the API provided by the invention into apps of service providers enable the service providers monitor Wi-Fi access points of interest. B2C customers can also enter a group ID to the app and can view the information through a web console from the apps as a sensor. This provides an app owner an alternative revenue generation mechanism besides revenue generation from advertisements.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for determining an optimal wireless channel for a Wi-Fi access point in a cloud-based software defined network (SDN) using an Application Programming Interfaces (API), the method comprising:

collecting, by the API, media access control (MAC) addresses and measurement information from a plurality of nearby Wi-Fi access points to a client device, wherein the measurement information comprises Received Signal Strength Indicators (RSSIs), radio frequency (RF) measurements, PING statistics, Universal Plug and Play (UPnP) information, and device information of the plurality of nearby Wi-Fi access points;

determining, by an Artificial Intelligence (AI) model, a location of the client device based on analyzing the measurement information collected from the plurality of nearby Wi-Fi access points, wherein the determining comprises creating, by the API, a plurality of clusters of Wi-Fi access points and updating the plurality of clusters with at least one newly identified Wi-Fi access point, wherein the API utilizes a distribution algorithm to allocate the at least one newly identified Wi-Fi access point to a cluster of the plurality of clusters based on a distance of the at least one newly identified Wi-Fi access point from the cluster and the measurement information collected from the plurality of nearby Wi-Fi access points;

calculating, by the API, an optimal wireless channel for a Wi-Fi access point from the cluster using the AI model, based on the location of the client device; and enabling, via the API, the client device to automatically switch to the optimal wireless channel and a frequency band, to connect with the Wi-Fi access point.

2. The method of claim 1 further comprises managing, by one or more processors, resources of the API based on a number of incoming requests to the API.

3. The method of claim 1 wherein the collecting comprises utilizing the API to receive the measurement information at a server according to time and location, and record the measurement information in a database.

4. The method of claim 3 further comprises, storing, by the API, a Wi-Fi access point of the plurality of nearby Wi-Fi access points in the database, in response to determining the measurement information is taken from a MAC address corresponding to the Wi-Fi access point which is not in the database.

5. The method of claim 4 further comprises, checking, by the API, for any changes in the measurement information of the plurality of nearby Wi-Fi access points in the database, and updating the database.

6. The method of claim 1, wherein the determining further comprises using a distribution algorithm for evaluating position/distance of the plurality of nearby Wi-Fi access points and then utilizing a KMeans algorithm for allocating each of the plurality of nearby Wi-Fi access points to a cluster of the plurality of clusters based on the evaluated position/distance.

7. The method of claim 1, wherein the creating further comprises using an algorithm in the AI model to statistically identify at least one cluster of the plurality of clusters and solve the optimization problem of each cluster of the plurality of clusters and combine an end result of the solving.

8. The method of claim 7 further comprises identifying, by one or more processors, a cluster from another cluster if the cluster is distant by radio strength measurements.

9. The method of claim 1, wherein the calculating further comprises utilizing a Basic Service Set (BSS) coloring technique to assign color codes to wireless channels of Wi-Fi access points in the cluster, wherein the BSS coloring technique addresses medium contention overhead due to overlapping basic service set (OBSS) and spatial reuse of the wireless channels.

10. The method of claim 1, wherein a frequency band is at least one of a 2.4 GHz band, a 5 GHz band, and a 6 GHz band.

11. The method of claim 1 further comprises providing, by the API, applicationaware optimization by assigning an interference free channel to a user of an application according to a session type of the application.

12. A system for determining an optimal wireless channel for a Wi-Fi access point in a cloud-based software defined network (SDN) using an Application Programming Interfaces (API), the system comprising:

a memory;

a processor communicatively coupled to the memory, wherein the processor is configured to:

collect, by the API, media access control (MAC) addresses and measurement information from a plurality of nearby Wi-Fi access points to a client device, wherein the measurement information comprises Received Signal Strength Indicators (RSSIs), radio frequency (RF) measurements, PING statistics, Universal Plug and Play (UPnP) information, and device information of the plurality of nearby Wi-Fi access points;

determine, by an Artificial Intelligence (AI) model, a location of the client device based on analyzing the measurement information collected from the plurality of nearby Wi-Fi access points, wherein the determining comprises creating, by the API, a plurality of clusters of Wi-Fi access points and updating the plurality of clusters with at least one newly identified Wi-Fi access point, wherein the API utilizes a distribution algorithm to allocate the at least one newly identified Wi-Fi access point to a cluster of the plurality of clusters based on a distance of the at least one newly identified Wi-Fi access point from the cluster and the measurement information collected from the plurality of nearby Wi-Fi access points;

calculate, by the API, an optimal wireless channel for a Wi-Fi access point from the cluster using the AI model, based on the location of the client device; and enable, via the API, the client device to automatically switch to the optimal wireless channel and a frequency band, to connect with the Wi-Fi access point.

13. The system of claim 12, wherein the processor is configured to manage resources of the API based on a number of incoming requests to the API.

14. The system of claim 12, wherein the processor is configured to utilize the API to receive the measurement information at a server according to time and location, and record the measurement information in a database.

15. The system of claim 14, wherein the processor is configured to store, by the API, a Wi-Fi access point of the plurality of nearby Wi-Fi access points in the database, in response to determining the measurement information is taken from a MAC address corresponding to the Wi-Fi access point which is not in the database.

16. The system of claim 14, wherein the processor is configured to check, by the API, for any changes in the measurement information of the plurality of nearby Wi-Fi access points in the database, and updating the database.

17. The system of claim 12, wherein the processor is configured to use a distribution algorithm for evaluating position/distance of the plurality of nearby Wi-Fi access points and then utilizing a KMeans algorithm for allocating each of the plurality of nearby Wi-Fi access points to a cluster of the plurality of clusters based on the evaluated position/distance.

18. The system of claim 12, wherein the processor is configured to use an algorithm in the AI model to statistically identify at least one cluster of the plurality of clusters and solve the optimization problem of each cluster of the plurality of clusters and combine an end result of the solving.

19. The system of claim 18, wherein the processor is configured to identify a cluster from another cluster if the cluster is distant by radio strength measurements.

20. The system of claim 12, wherein the processor is configured to utilize a Basic Service Set (BSS) coloring technique to assign color codes to wireless channels of Wi-Fi access points in the cluster, wherein the BSS coloring technique addresses medium contention overhead due to overlapping basic service set (OBSS) and spatial reuse of the wireless channels.

* * * * *